(12) United States Patent
Sasanuma et al.

(10) Patent No.: US 7,637,148 B2
(45) Date of Patent: Dec. 29, 2009

(54) LIQUID STATE DETECTING SENSOR

(75) Inventors: Takeo Sasanuma, Komaki (JP);
Yoshikuni Sato, Komaki (JP); Takashi Yamomoto, Komaki (JP); Hisashi Sasaki, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 170 days.

(21) Appl. No.: 12/013,820

(22) Filed: Jan. 14, 2008

(65) Prior Publication Data
US 2008/0173074 A1   Jul. 24, 2008

(30) Foreign Application Priority Data
Jan. 15, 2007   (JP) ............................. 2007-006327

(51) Int. Cl.
*G01N 25/00* (2006.01)
(52) U.S. Cl. .................................................. 73/61.76
(58) Field of Classification Search ................ 73/61.46, 73/61.76, 53.01
See application file for complete search history.

(56) References Cited
U.S. PATENT DOCUMENTS

| | | | | |
|---|---|---|---|---|
| 6,551,478 | B1 * | 4/2003 | Bielawski et al. ........... | 204/433 |
| 7,467,512 | B2 * | 12/2008 | Nishina et al. ................ | 60/286 |
| 7,499,814 | B2 * | 3/2009 | Nishina et al. ................ | 702/50 |
| 7,574,900 | B2 * | 8/2009 | Sasanuma et al. ........... | 73/61.46 |
| 2007/0054409 | A1 * | 3/2007 | Inoue et al. .................. | 436/108 |
| 2007/0110618 | A1 * | 5/2007 | Sasanuma et al. ........... | 422/68.1 |
| 2007/0113625 | A1 * | 5/2007 | Sasanuma et al. ........... | 73/61.46 |
| 2007/0125663 | A1 * | 6/2007 | Sasanuma et al. ........... | 205/777 |
| 2007/0209428 | A1 * | 9/2007 | Nishina et al. ............. | 73/61.76 |

FOREIGN PATENT DOCUMENTS

| | | |
|---|---|---|
| EP | 1 752 762 | 2/2007 |
| EP | 1752762 | 2/2007 |
| JP | 2005337969 | 12/2005 |

\* cited by examiner

*Primary Examiner*—John Fitzgerald
(74) *Attorney, Agent, or Firm*—Stites & Harbison PLLC; Ross F. Hunt, Jr.; Jeffrey A. Haeberlin

(57) ABSTRACT

A liquid state detecting sensor includes: a state detecting element including a heating resistor; an energization unit; a first output acquiring unit; a reference acquiring unit; a first calculating unit; a state detecting unit; a second output acquiring unit; a second calculating unit; an excess-temperature-rise determining unit; and an energization terminating unit. The energization termination unit terminates energizing of the heating resistor by the energization unit before the end of a detection time period in response to a determination by the excessive-temperature-rise determining unit that an excessive temperature rise has occurred in the state detecting element.

6 Claims, 10 Drawing Sheets

LIQUID STATE DETECTING SENSOR

FIELD OF THE INVENTION

The present invention relates to a liquid state detecting sensor for detecting the state of a liquid to be measured.

BACKGROUND OF THE INVENTION

An NOx selective reduction catalyst (SCR) is in some cases used in an exhaust gas purifying apparatus for reducing nitrogen oxides (NOx) emitted from, for example, a diesel powered automobile, and a urea aqueous solution is used as its reductant. It is known that a urea aqueous solution with a urea concentration of 32.5 wt % can be advantageously used for effectively performing this reducing reaction.

However, in the urea aqueous solution accommodated in a urea water tank mounted in a diesel powered automobile, there are cases where the urea concentration changes due to such as a change over time. In addition, there is a possibility of a different type of solution (such as light oil) or water becoming erroneously mixed into the urea water tank. In view of such circumstances, liquid state detecting sensors have been proposed to manage the state of the liquid (such as the urea concentration of the urea aqueous solution) in the urea water tank (refer to JP-A-2005-84026 (corresponding to US2007/0054409A1), JP-A-2005-127262 (corresponding to US2007/0209428A1) and JP-A-2005-337969 (corresponding to EP1752762A1), for example).

The liquid state detecting sensors in JP-A-2005-84026 (corresponding to US2007/0054409A1), JP-A-2005-127262 (corresponding to US2007/0209428A1) and JP-A-2005-337969 (corresponding to EP1752762A1) have an element (state detecting element) in which a substrate, a temperature sensing element, an insulating layer, and a heating element are sequentially stacked. In this liquid state detecting sensor, the heating element is energized for a predetermined time duration, and the urea concentration and the type of the liquid to be measured are detected on the basis of a temperature change of the heating element measured by a temperature sensing element before and after the energization. Specifically, since a difference arises in the heat capacity of the urea aqueous solution due to a difference in the concentration of urea contained in the urea aqueous solution, a difference arises in the temperature change of the heating element due to the difference in the urea concentration. The urea concentration and the type of the liquid to be measured are detected by detecting the temperature change of the heating element by making use of this principle.

In cases where the urea aqueous solution in the urea water tank has decreased, and its liquid level has dropped below the position of the element (heating element), or in cases where a liquid (such as light oil) whose thermal conductivity is smaller than that of the urea aqueous solution is accommodated in the urea water tank, the rate of temperature increase of the heating element becomes high, so that there is a possibility of the heating element undergoing an abnormal temperature rise. In such a situation, if the heating element is energized for a predetermined time duration (4 seconds and 8 seconds are respectively cited by way of example in JP-A-2005-84026 (corresponding to US2007/0054409A1) and JP-A-2005-337969 (corresponding to EP1752762A1)) as in the case where an appropriate amount of the urea aqueous solution is accommodated in the urea water tank, there has been a possibility of the heating element undergoing an excessive temperature rise, resulting in the failure (breakage or the like) of the element.

It should be noted that it is described in JP-A-2005-84026 (corresponding to US2007/0054409A1) that in cases such as where the urea aqueous solution in the urea water tank has decreased, and its liquid level has dropped below the position of the element (heating element), an alarm can be issued by the liquid state detecting sensor. However, since the heating element has already undergone the excessive temperature rise for a long time period when the alarm is issued, it has been impossible to prevent the failure of the element ascribable to the excessive temperature rise.

SUMMARY OF THE INVENTION

The present invention has been devised to overcome the above-described problems, and one object thereof is to provide a technique for preventing damage to or breakage of the state detecting element due to an excessive temperature rise.

According to one important aspect of the invention, there is provided a liquid state detecting sensor including: a state detecting element including a heating resistor having a resistance value that changes in correspondence with a temperature thereof, the state detecting element being immersed in a liquid to be measured; an energization unit for effecting energization or energizing of the heating resistor; a first output acquiring unit for acquiring a first output value which is outputted in correspondence with the resistance value of the heating resistor at the end of a detection time period measured from a start of energization of the heating resistor by the energization unit; a reference acquiring unit for acquiring a reference value which is outputted in correspondence with the resistance value of the heating resistor prior to the end of the detection time period; a first calculating unit for calculating a first calculated value using the first output value and the reference value; and a state detecting unit for detecting a state of the liquid to be measured based on the first calculated value; a second output acquiring unit for acquiring a second output value corresponding to the resistance value of the heating resistor after acquiring the reference value and before acquiring the first output value; a second calculating unit for calculating a second calculated value using the second output value and the reference value; an excessive-temperature-rise determining unit for determining whether an excessive temperature rise has occurred in the state detecting element based on: (i) the second calculated value; and (ii) an excessive-temperature-rise determining threshold value; and an energization terminating unit for terminating the energization of the heating resistor by the energization unit before the end of the detection time period in response to determination by the excessive-temperature-rise determining unit that an excessive temperature rise has occurred in the state detecting element.

In the liquid state detecting sensor in accordance with the invention, the liquid to be measured may be, for example, a urea aqueous solution.

Since the thermal conductivity of a liquid differs with the concentration of components contained in the liquid, when the heating resistor is energized the rate of temperature increase of the liquid differs with the differences in the concentration of the components contained in the liquid. In the liquid state detecting sensor in accordance with the invention, since the state detecting element having the heating resistor is immersed in a liquid to be measured, the concentration of components contained in the liquid affects the rate of temperature increase of the liquid and the temperature rise of the heating resistor. Since this heating resistor has a resistance value corresponding to its own temperature, a difference arises in the resistance value of the heating resistor due to a difference in the state of the liquid to be measured (i.e., the concentration of a particular component or a liquid type). Accordingly, it is possible to appropriately detect the state of the liquid to be measured (i.e., the concentration of a particular component or a liquid type) on the basis of the first output value and the reference value which are attributable to the resistance value of the heating resistor.

Moreover, the liquid state detecting sensor in accordance with the invention calculates the second calculated value by using the reference value and the second output value acquired by the second output acquiring unit within the time after the acquisition of the reference value and before the acquisition of the first output value. Further, a determination is made as to whether or not an excessive temperature rise has occurred in the state detecting element on the basis of this second calculated value and the excessive-temperature-rise determining threshold value. In the case where it is determined that an excessive temperature rise has occurred, the energization terminating unit terminates the energization of the heating resistor before the end of the detection time period.

Thus, the energization of the heating resistor is forcibly terminated before the end of the detection time period even in a case where the state detecting element is exposed to a situation where its temperature is liable to excessively rise during the energization of the heating resistor, such as when the liquid to be measured has run short or when a liquid having an extremely lower thermal conductivity than the liquid to be originally used has been erroneously used as the liquid to be measured (it is possible to illustrate a case where although a urea aqueous solution should be used, light oil is erroneously used). Accordingly, even if an excessive temperature rise has occurred in the heating resistor and, hence, the state detecting element, it is possible to prevent that excessive temperature rise from continuing for a long period of time, thereby making it possible to prevent the failure of the state detecting element in consequence of the excessive temperature rise.

It should be noted that, as the first and second output values, values corresponding to voltage values generated in the heating resistor can be used in the case where a constant current is allowed to flow across the heating resistor by the energization unit. In addition, in the case where a constant voltage is supplied to the heating resistor by the energization unit, it is possible to use values corresponding to current values flowing across the heating resistor.

Further, as the first calculated value, it is sufficient to use an output difference (differential value) between the first output value and the reference value or a value of a ratio between the first output value and the reference value. As for the second calculated value as well, it is sufficient to use such as a differential value between the second output value and the reference value in the same way as the aforementioned first calculated value.

Furthermore, the above-described liquid state detecting sensor may further comprise: a third output acquiring unit for acquiring a third output value which is outputted in correspondence with the resistance value of the heating resistor prior to the end of the detection time period and after acquiring the second output value; and a third calculating unit for calculating a third calculated value using the third output value and the reference value, wherein the state detecting unit detects the state of the liquid to be measured based on the first calculated value and the third calculated value.

In the liquid state detecting sensor in accordance with the invention, when the heating resistor is being energized by the energization unit, the reference value, the first output value, and the third output value are calculated at different timings. Further, the state of the liquid to be measured is detected on the basis of two values including the first calculated value calculated by using the first output value and the reference value as well as the third calculated value calculated by using the third output value and the reference value. As a result, the state of the liquid to be measured can be determined with high accuracy, and it becomes possible to satisfactorily carry out particularly the determination of the type of liquid to be measured (for example, a determination as to whether the liquid to be measured is a urea aqueous solution or a sugar solution).

It should be noted that, as the third output value, in the same way as the first and second output values, a value corresponding to a voltage value generated in the heating resistor may be used in the case where a constant current is allowed to flow across the heating resistor by the energization unit. In addition, in the case where a constant voltage is supplied to the heating resistor by the energization unit, a value corresponding to a current value flowing across the heating resistor may be used. As the third calculated value, it is sufficient to use a differential value between the third output value and the reference value in the same way as the first and second calculated values.

Furthermore, in the liquid state detecting sensor according to any one of the above-described aspects, the second output acquiring unit may be adapted to acquire the second output value before one-half of the detection time period has elapsed.

Although the second output value is acquired to determine whether or not an excessive temperature rise has occurred in the state detecting element, the closer to the end of the detection time period the acquiring of the second output value occurs, the greater the delay in determining whether or not the excessive temperature rise has occurred in the state detecting element. Accordingly, in accordance with one implementation of the invention, the arrangement provided is such that, by taking the detection time as a reference, the second output value is acquired before one-half of the detection time period has elapsed. In consequence, acquiring the second output value occurs in the first half of the detection time period, so that the determination as to whether or not an excessive temperature rise has occurred in the state detecting element can be made in an early stage.

In addition, the above-described energization terminating unit may terminate the energization at any time after the determination that an excessive temperature rise has occurred in the state detecting element; however, the energization terminating unit preferably terminates the energization of the heating resistor by the energization unit immediately after it is determined by the excessive-temperature-rise determining unit that the excessive temperature rise has occurred in the state detecting element.

If such an arrangement is provided, since the energization of the heating resistor is terminated immediately after the determination that the excessive temperature rise has occurred in the state detecting element, it is possible to prevent the failure of the state detecting element more reliably.

In addition, in the liquid state detecting sensor according to any one of the above-described aspects, in a case where the second calculated value has exceeded the excessive-temperature-rise determining threshold value, the excessive-temperature-rise determining unit may determine that the excessive temperature rise has occurred in the state detecting element, and in a case where the second calculated value has exceeded a level determining threshold value which is greater than the excessive-temperature-rise determining threshold value, the excessive-temperature-rise determining unit may determine that a liquid level of the liquid to be measured has dropped below the heating resistor.

As described above, the cases where the heating resistor undergoes excessive temperature rise include (1) the case where the thermal conductivity of the liquid to be measured is excessively small, such as a case where although a urea aqueous solution should be used as the liquid to be measured, light oil is erroneously used, and (2) the case where the liquid level of the liquid to be measured has dropped below the heating resistor. In these cases, since light oil or air have smaller thermal conductivities than urea aqueous solution, the second calculated value will indicate a higher than expected temperature rise.

Accordingly, in the liquid state detecting sensor in accordance with another implementation of the invention, in addition to the determination of the presence or absence of the occurrence of an excessive temperature rise of the state detecting element on the basis of the second calculated value, in a case where the second calculated value has exceeded a level determining threshold value which is greater than the excessive-temperature-rise determining threshold value, a determination is made that the liquid level has dropped below the heating resistor. As a result, it becomes possible to provide a measure such as notifying the replenishment of the liquid to be measured to the user of the equipment (such as a diesel engine) equipped with the liquid state detecting sensor.

Furthermore, in accordance with yet another implementation of the invention, the heating resistor of the state detecting element may be sealed in an insulating ceramic substrate. In the case of such a liquid state detecting element, the element itself can be directly immersed in the liquid to be measured. For this reason, the sensitivity is excellent as compared with an element in which a thin-film chip is resin molded so as to prevent the ingress of the urea aqueous solution into the thin-film chip (e.g., the element disclosed in JP-A-2005-84026). Accordingly, the liquid state detecting sensor in accordance with the invention is able to detect the state of the liquid to be measured with high accuracy, and is able to suppress the excessive temperature rise of the state detecting element.

Other features and advantages of the invention will be set forth in, or apparent from, the detailed description of preferred embodiments of the invention found below.

DETAILED DESCRIPTION OF PREFERRED EMBODIMENTS OF THE INVENTION

Figure 1:
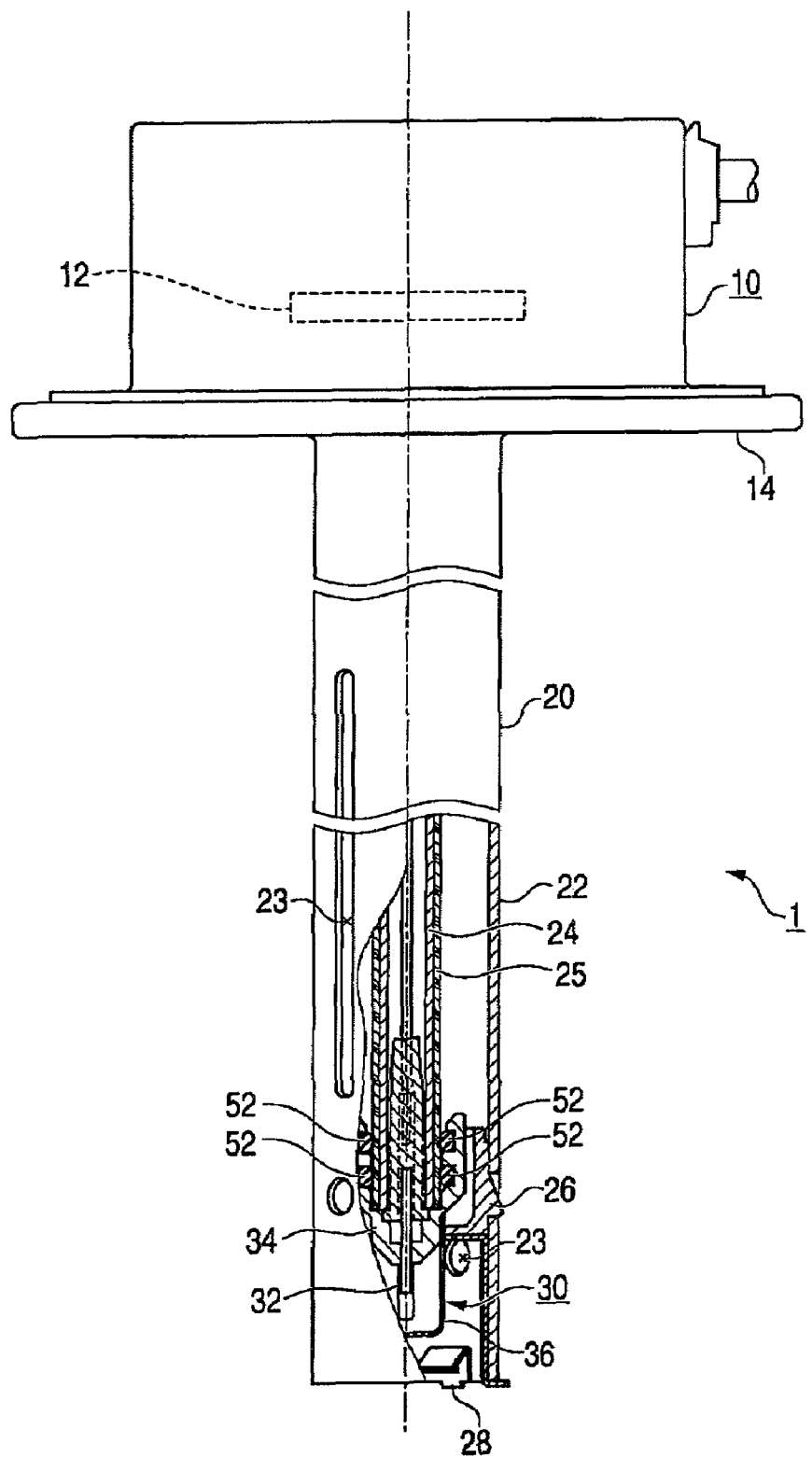
FIG. 1 is a side elevational view, with selected portions cut away, of an exemplary liquid state detecting sensor according to a preferred embodiment of the invention.

Referring now to the drawings, a description will be given of an embodiment of the invention.

(1) Overall Configuration

A liquid state detecting sensor 1 is used for detecting the state of a liquid (liquid to be measured) accommodated in a tank, and is comprised of a box-shaped base body 10, a cylindrical electrode structure 20 protruding from a lower end (the lower side in FIG. 1) of this base body 10, and an element structure 30 disposed in this electrode structure 20.

It should be noted that, in this embodiment, a case will be cited by way of example in which the invention is applied to the detection of the state of a urea aqueous solution accommodated in the tank for accommodating the urea aqueous solution.

A circuit board 12 for controlling the entire liquid state detecting sensor 1 is incorporated in the base body 10, and this circuit board 12 (specifically, a below-described microprocessor 74 mounted on the circuit board 12) executes the state detection processing which will be described later.

In addition, this base body 10 has a mounting portion 14 formed at its lower end to realize the mounting of the base body 10 on a mount portion (not shown) of the tank. The base body 10 is mounted on an upper portion of the tank by means of this mounting portion 14. Consequently, it is possible to dispose the electrode structure 20 and the element structure 30 in such a manner as to extend from that mount portion into the tank interior.

The electrode structure 20 is a portion which functions as a detecting portion for detecting the liquid level of the urea aqueous solution accommodated in the tank. The electrode structure 20 consists of an outer cylindrical member 22 and an inner cylindrical member 24 ("the cylindrical members 22, 24") having different outside diameters; a spacer 26 for positioning the cylindrical members 22, 24 such that the cylindrical members 22, 24 are disposed concentrically in a cross section perpendicular to their longitudinal direction (vertical direction in FIG. 1); and a rectifying member 28 fitted in a lower end side of the outer cylindrical member 22.

Of these, the cylindrical members 22, 24 function as a pair of electrodes respectively having conductive properties. The outer cylindrical member 22 located on the outer side is connected to the ground level through the base body 10, while the inner cylindrical member 24 located on the inner side is electrically connected to the circuit board 12 in the base body 10. It should be noted that, on the inner cylindrical member 24, an insulating coating 25 formed of fluororesin is formed in a region of its outer peripheral surface which comes into contact with the urea aqueous solution.

In addition, the outer cylindrical member 22 has a greater amount of downward projection than the inner cylindrical member 24, and accommodates therein the inner cylindrical member 24 together with the element structure 30 attached to its lower end side. It should be noted that a plurality of circulation holes 23 each having the shape of a slit or a round hole are formed in the outer cylindrical member 22 so as to allow the urea aqueous solution in the tank to communicate between its outer and inner sides.

In addition, the spacer 26 is formed of an insulating material (such as rubber), in order to establish electrical insulation between the cylindrical members 22, 24, and position them at a predetermined interval.

In addition, the rectifying member 28 is a plate-shaped member disposed in such a manner as to close a central portion of a lower end side of the outer cylindrical member 22, and restrains a sudden flow of the urea aqueous solution from reaching the interior of the outer cylindrical member 22 in cases where the sudden flow has occurred in the urea aqueous solution in the tank. A plurality of projecting portions are discontinuously formed at outer peripheral positions of this rectifying member 28 itself. As these projecting portions are fitted to the outer cylindrical member 22, the rectifying member 28 is fixed to the outer cylindrical member 22. It should be noted that since gaps are respectively formed between adjacent ones of the projecting portions, the urea aqueous solution in the tank circulates between the inner and outer sides of the leading end portion of the outer cylindrical member 22 through these gaps.

In such an element structure 30, since the cylindrical members 22, 24 function as electrodes respectively disposed with gaps therebetween, the electrostatic capacity in the case where these electrode pairs are set as capacitors changes depending on the proportion by which the cylindrical members 22, 24 are immersed in the urea aqueous solution in their longitudinal direction. For this reason, it is possible to detect the liquid level of the urea aqueous solution in the tank interior on the basis of an output current in the case where an ac voltage is applied across the electrode pairs consisting of these cylindrical members 22, 24.

Figure 2:
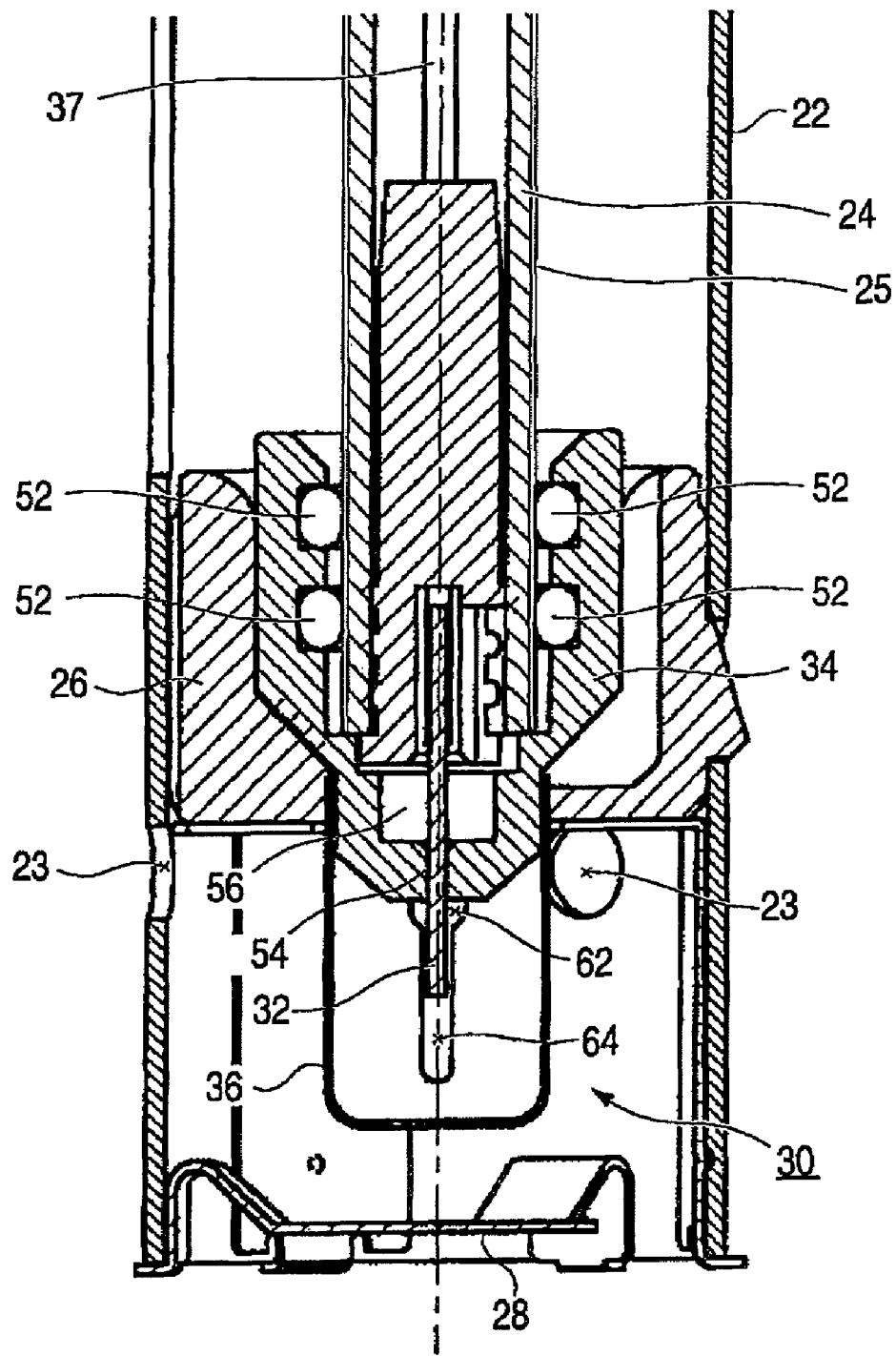
FIG. 2 is a partial longitudinal cross-sectional view of an electrode structure and an element structure of the liquid state detecting sensor of FIG. 1.

As shown in FIG. 2, the element structure 30 consists of a plate-shaped state detecting element 32, a holder 34 for fixing this state detecting element 32 to the lower end side of the inner cylindrical member 24, and a protector 36 for limiting the flow of the urea aqueous solution in the vicinity of the state detecting element 32.

Figure 3:
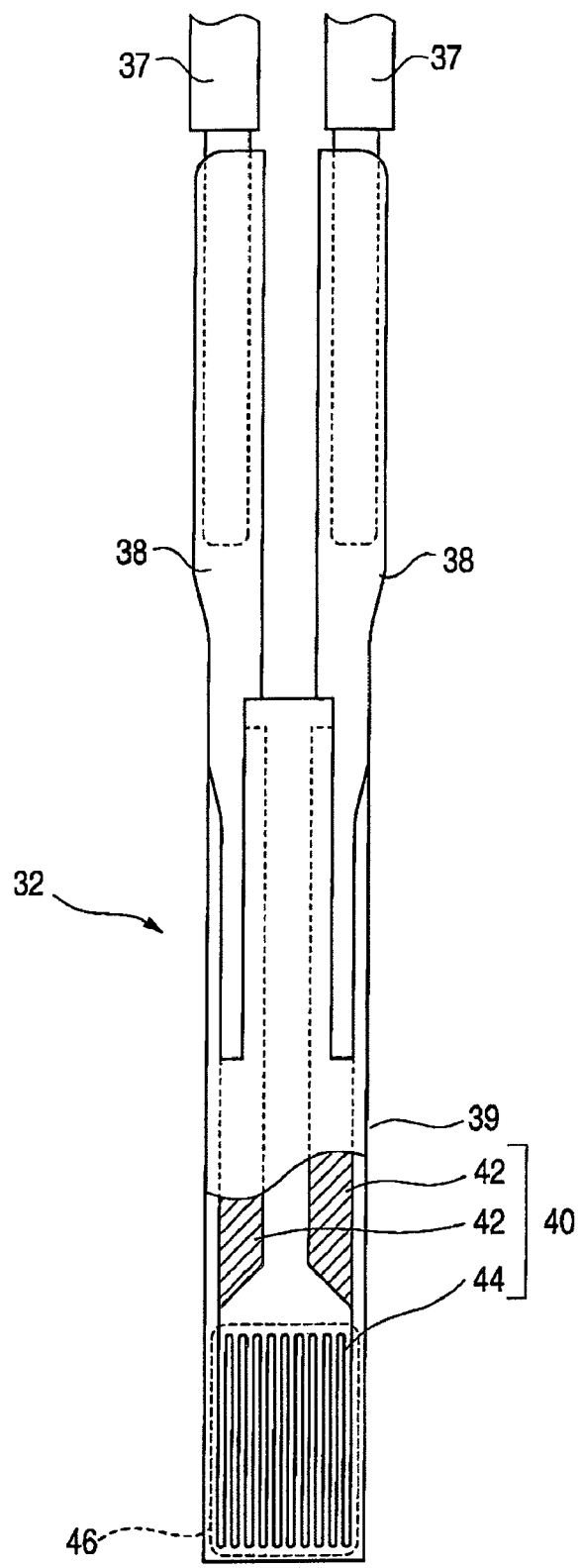
FIG. 3 is a front elevational view of a state detecting element of the liquid state detecting sensor of FIG. 1.

Of these, the state detecting element 32 is a plate-shaped element which is formed such that a conductor layer 40 formed principally of Pt or W is sealed between a pair of insulating ceramic layers respectively extending in the same direction, as shown in FIG. 3. It should be noted that a flat plate-shaped insulating ceramic substrate 39 is formed by the lamination of the pair of insulating ceramic layers.

This conductor layer 40 consists of a pair of lead portions 42 extending along the longitudinal direction (in the vertical direction in FIG. 3) of the state detecting element 32, as well as a heater portion 44 extending from a lower end (lower end in FIG. 3) of the lead portion 42 as a pattern of a heating resistor. This heater portion 44 is formed as a heater pattern which, on the lower end side of the state detecting element 32, expands in a meandering manner or serpentine pattern along the surface of the insulating ceramic substrate 39, and is formed with a smaller cross-sectional area than the cross-sectional area of the lead portion 42. It should be noted that the region of the surface of the ceramic layer where the heater portion 44 is disposed serves as a temperature rise region 46 which generates heat in response to the energization or energizing of this heating resistor (see FIG. 3).

In this conductor layer 40, the resistance value of the heater portion 44 changes in correspondence with its temperature, but if this conductor layer 40 is energized with a constant current, the voltage across the heater portion 44 assumes a value corresponding to its resistance value. Since this resistance value assumes a different value corresponding to the state of the urea aqueous solution (specifically, the concentration, temperature, and presence of a different type of liquid) which is present in the vicinity of the state detecting element 32, its output voltage also assumes a different value in correspondence with the state of the urea aqueous solution. Thus, it is possible to detect the state of the urea aqueous solution in the tank on the basis of the voltage across the heater portion 44 when the latter is energized, as will be described later.

It should be noted that the energization of this conductor layer 40 is realized by the circuit board 12 through a pair of cables 37 and a pair of intermediate terminals 38 leading from the upper end (upper end in FIG. 3) of the lead portion 42 to the circuit board 12.

The holder 34 is constituted by a cylindrical resinous member whose outside diameter and inside diameter are made smaller toward its lower end (lower end in FIG. 1), and is fitted over a lower end side of the cylindrical member 24 through an annular seal member 52.

An element-use hole 54 of such a size as to allow the state detecting element 32 to pass therethrough is formed in a lower end of this holder 34, and the state detecting element 32 is fixed in such a positional relationship as to extend through this element-use hole 54 into the interior of the inner cylindrical member 24. The fixation of this state detecting element 32 is realized by filling an adhesive 56 between the inner side of the holder 34 and the state detecting element 32.

The protector 36 is constituted by a cylindrical member, and is fitted on an outer surface of a lower end side of the holder 34 in such a positional relationship as to surround at least the temperature rise region 46 of the state detecting element 32 protruding from the lower end of the holder 34.

Figure 4A:
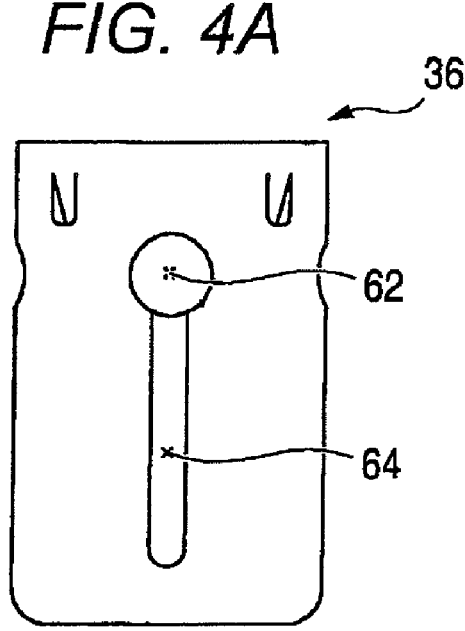
FIG. 4A is a front elevational view of a protector of the liquid state detecting sensor of FIG. 1.
Figure 4B:
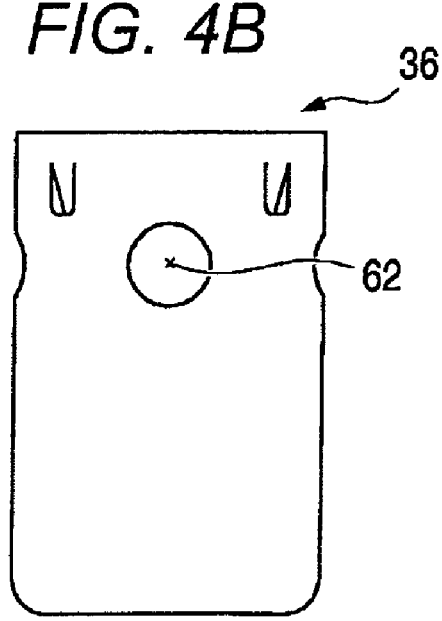
FIG. 4B is a side elevational view of a protector of the liquid state detecting sensor of FIG. 1.
Figure 4C:
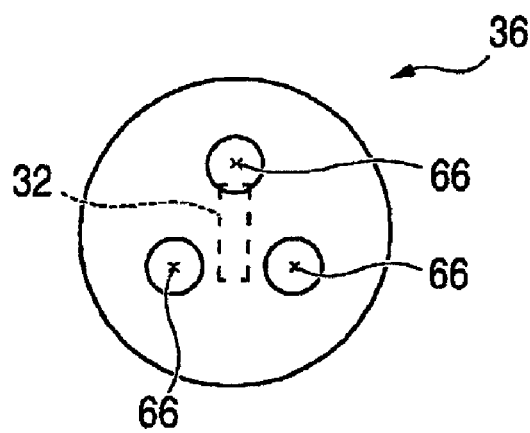
FIG. 4C is a bottom plan view of a protector of the liquid state detecting sensor of FIG. 1.

As shown in FIG. 4A, FIG. 4B, and FIG. 4C, a plurality of side circulation holes 62 are formed in the side surface of this protector 36 at its upper end (upper end in FIG. 1) side to allow the urea aqueous solution to circulate between its inner and outer sides. In addition, on the lower side of one of the side circulation holes 62, a slit 64 extending from this side circulation hole 62 along the longitudinal direction of the protector 36 is formed in the side surface of this protector 36. Further, the protector 36 is fitted in such a positional relationship that the side circulation holes 62 and the slit 64 do not directly face the obverse surface and the reverse surface of the state detecting element 32, which are the surfaces opposing the heater pattern of the heater portion 44.

In addition, a plurality of bottom circulation holes 66 each having a smaller diameter than the aforementioned side circulation hole 62 are formed in the bottom surface of this protector 36 to allow the urea aqueous solution to circulate between its inner and outer sides. These bottom circulation holes 66 are respectively disposed at positions where they do not overlap with the state detecting element 32 projected onto the bottom surface of the protector 36 (see the broken line in FIG. 4C).

Figure 5:
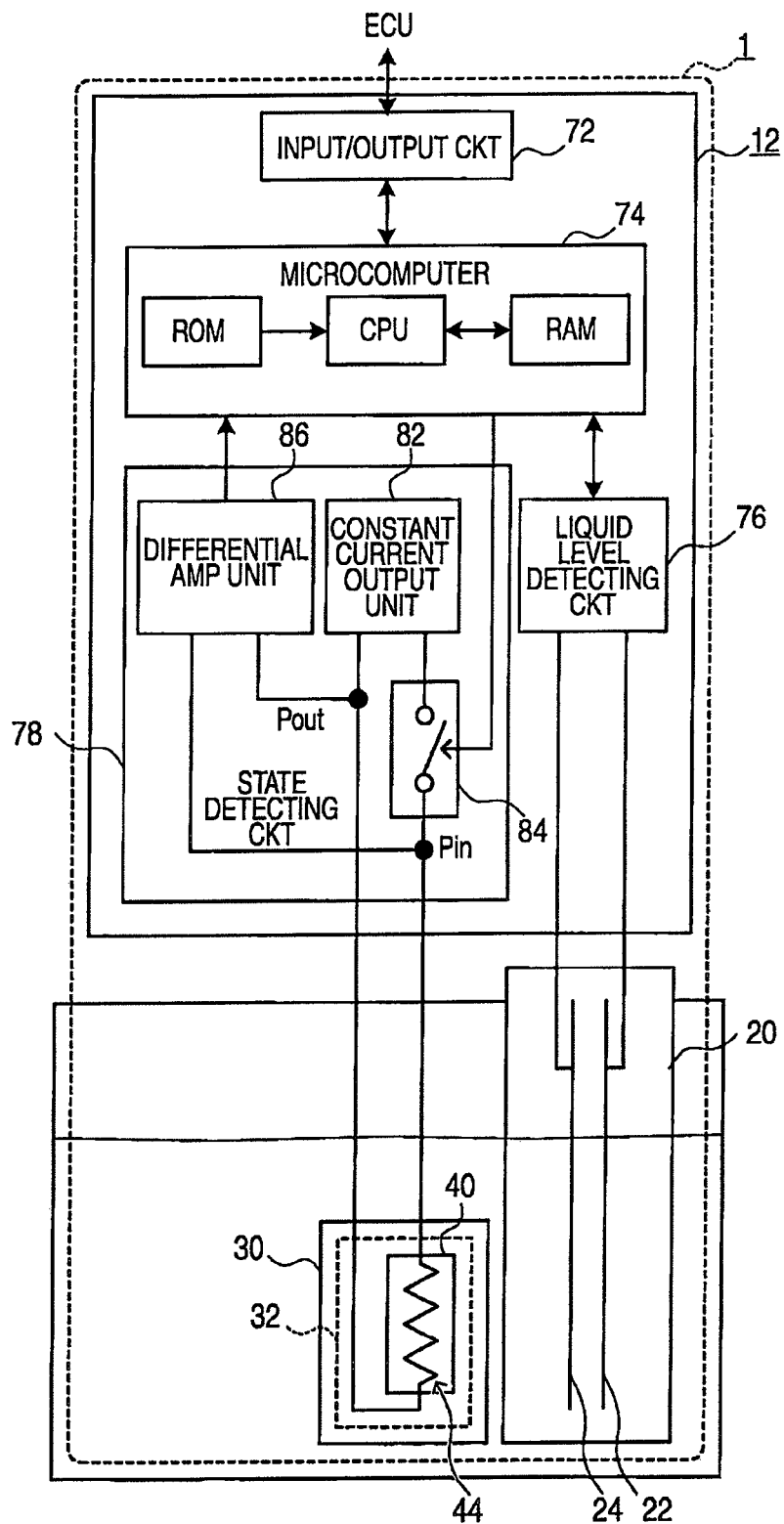
FIG. 5 is a block diagram illustrating an overall electrical configuration of an exemplary liquid state detecting sensor according to the invention.

In the liquid state detecting sensor 1 having the above-described configuration, as shown in FIG. 5, the circuit board 12 accommodated in the base body 10 includes, among others, an input/output circuit 72 for controlling the input and output of information to and from an external circuit (specifically, an electronic control unit (ECU)) connected to the liquid state detecting sensor 1; a microprocessor 74 for controlling the overall operation of the liquid state detecting sensor 1; a liquid level detecting circuit 76 for effecting the application of an ac voltage to the electrode structure 20 and the detection of an output current; and a state detecting circuit 78 for effecting the energization of the state detecting element 32 of the element structure 30 and the detection of an output voltage.

Of these, the liquid level detecting circuit 76 effects the application of an ac voltage to the electrode structure 20 upon receiving a command from the microprocessor 74, converts into a voltage value an output current which flowed at that time, and outputs its value to the microprocessor 74. After issuing the command to the electrode structure 20, the microprocessor 74 specifies the liquid level at that point of time by a known technique on the basis of the voltage value outputted from this electrode structure 20.

In addition, the state detecting circuit 78 includes a constant current output unit 82 for effecting the energization of the conductor layer 40 of the element structure 30 with a constant current; a switch unit 84 for allowing a path for energizing the conductor layer 40 by the constant current output unit 82 to conduct current or for opening the path; and a differential amplifier unit 86 for detecting a potential difference (i.e., voltage) across both ends of the heater portion 44 in the conductor layer 40 and outputting it to the microprocessor 74. After issuing a command to the state detecting circuit 78 (switch unit 84), the microprocessor 74 specifies the state of the urea aqueous solution at that point of time by below-described state detection processing on the basis of a voltage value outputted from this state detecting circuit 78 (differential amplifier unit 86).

(2) State Detection Processing by the Microcomputer

Figure 6:
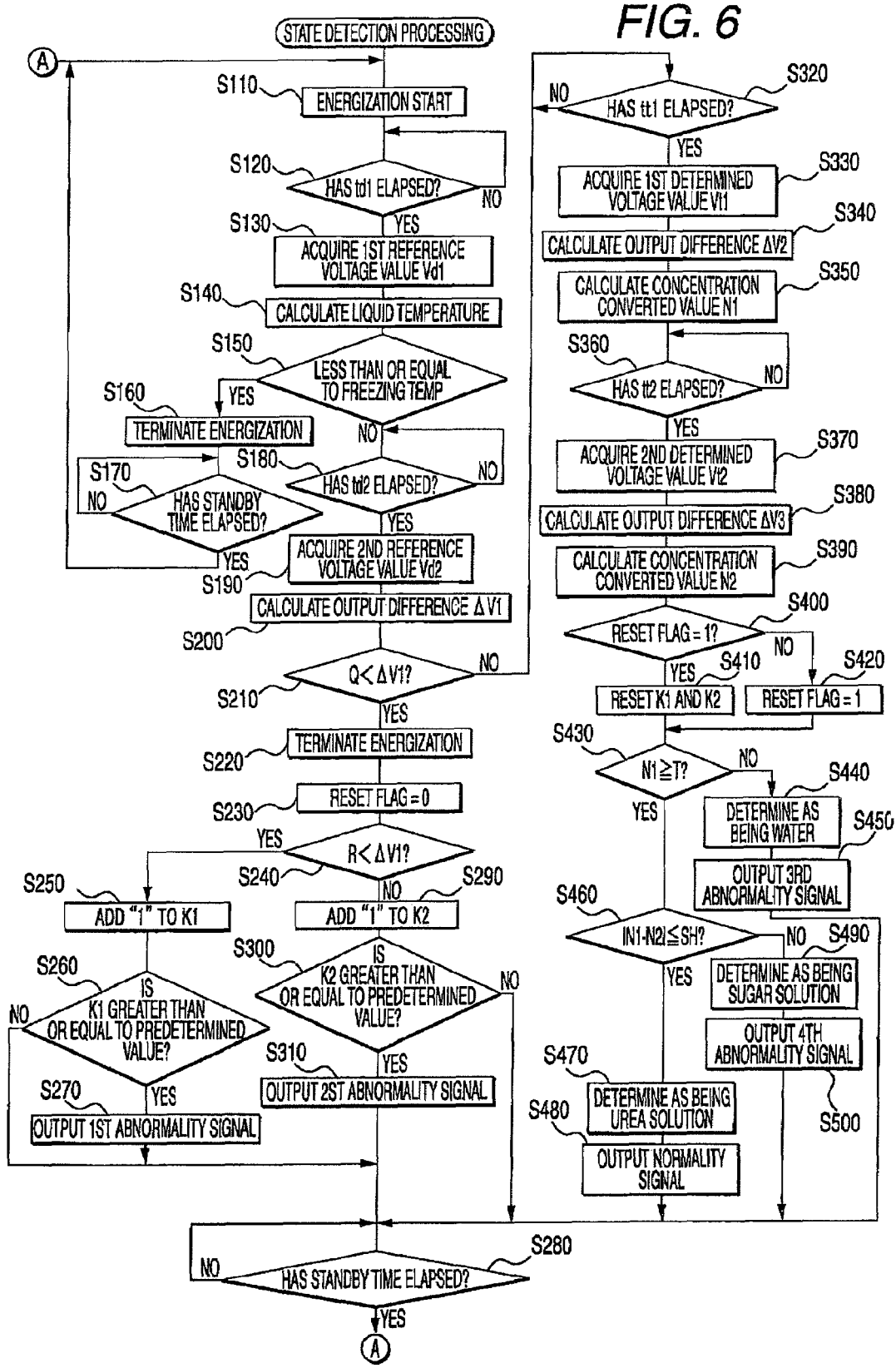
FIG. 6 is a flowchart illustrating state detection processing of an exemplary liquid state detecting sensor according to the invention.

Referring now to FIG. 6, a description will be given of the processing procedure of the state detection processing which is executed in accordance with a program stored in a built-in memory of the microprocessor 74 mounted on the circuit board 12. This state detection processing is started upon receipt of a command from the external circuit (ECU) connected to the liquid state detecting sensor 1.

When this state detection processing is started, the energization of the element structure 30 is first started (S110). Here, a command is issued to the switch unit 84 of the state detecting circuit 78 to the effect that the energizing path is to conduct current. As the switch unit 84, upon receiving this command, makes the path leading from the constant current output unit 82 to the conductor layer 40 of the element structure 30, the energization of this conductor layer 40 is started.

Next, the liquid state detecting sensor 1 is set in a standby state until the lapse of a first reference time td1 (10 ms in this embodiment) from the start of energization in S110 (S120: NO). After the lapse of the first reference time td1 (S120: YES), a first reference voltage value Vd1, which is outputted from the differential amplifier unit 86 of the state detecting circuit 78 at this point of time, is acquired as a value indicative of a voltage across the state detecting element 32 (specifically, the heater portion 44) (S130).

Next, the temperature of the state detecting element 32 in the element structure 30 is computed from the first reference voltage value Vd1 acquired in S130, and the temperature of the liquid to be measured in the tank is calculated on the basis of this temperature (S140).

Next, a determination is made as to whether or not the temperature of the liquid to be measured specified in S140 is less than or equal to the temperature (−11° C.) at which the urea aqueous solution to be accommodated in the tank as the liquid to be measured freezes (S150). If it is determined that the temperature is less than or equal to that freezing temperature (S150: YES), the energization of the state detecting element 32 started in S110 is terminated (S160).

Here, a command is issued to the switch unit 84 of the state detecting circuit 78 to the effect that the path for energizing the conductor layer 40 by the constant current output unit 82 is to be opened. Upon receiving this command, the switch unit 84 opens the path leading from the constant current output unit 82 to the conductor layer 40, thereby terminating the energization of the conductor layer 40.

Then, after being set in a standby state until the lapse of a predetermined standby time (S170: NO), the operation proceeds to the processing of S110 after the standby time has elapsed (S170: YES).

Meanwhile, if it is determined in S150 above that the temperature specified in S140 is greater than the freezing temperature (S150: NO), the liquid state detecting sensor 1 is set in a standby state until the lapse of a second reference time td2 (300 ms in this embodiment) in terms of the elapsed time subsequent to the start of energization in S110 (S180: NO). It should be noted that this second reference time td2 is set to a time period that is less than one-half of a detection time period of a below-described second threshold time tt2 (3000 ms in this embodiment) measured from the start of energization of the heater portion 44.

Subsequently, after the lapse of a second reference time td2 (S180: YES), a second reference voltage value Vd2, which is outputted from the differential amplifier unit 86 of the state detecting circuit 78 at this point of time, is acquired as a value indicative of an output voltage from the state detecting element 32 (specifically, the heater portion 44) (S190).

Next, a value ΔV1 (=Vd2−Vd1) indicative of an output difference between the second reference voltage value Vd2 acquired in S190 and the first reference voltage value Vd1 acquired in S130 is calculated (S200).

Figure 7:
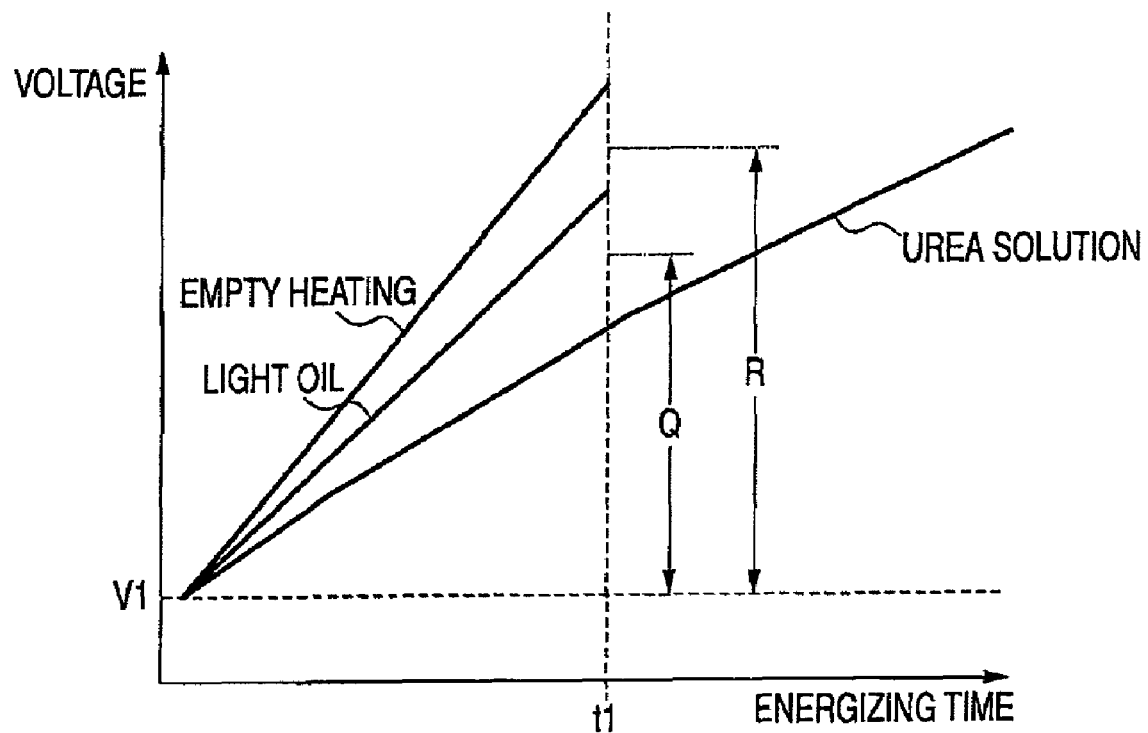
FIG. 7 is a diagram illustrating relationships between a time period of energizing a heater portion of an exemplary liquid state detecting sensor according to the invention versus measured voltage for fluids having different thermal conductivities.

Then, a determination is made as to whether or not the output difference ΔV1 calculated in S200 exceeds an excessive-temperature-rise determining threshold value Q which normally cannot be reached as an output difference at the point of time when the second reference time td2 has elapsed (i.e., whether or not Q<ΔV1 is satisfied) (S210). This "excessive-temperature-rise determining threshold value Q" is a threshold value for determining the excessive temperature rise of the state detecting element 32, and it is a value set in advance as an output difference which can be calculated in S200 above in the case where the amount of the urea aqueous solution accommodated in the tank is small (i.e., a state of so-called empty heating), or in the case where a liquid (such as light oil) having small thermal conductivity other than water is accommodated (see FIG. 7).

It should be noted that the fact that the output difference ΔV1 in this S200 exceeds the excessive-temperature-rise determining threshold value Q means that the potential difference across both ends of the heater portion 44 has become large, and that the heater portion 44 (i.e., the state detecting element 32) has possibly undergone an excessive temperature rise. Namely, in this S210, on the basis of the fact that the output difference ΔV1 has exceeded the excessive-temperature-rise determining threshold value Q upon the lapse of the second reference time td2, it is determined that an excessive temperature rise has occurred in the state detecting element 32.

If it is determined in this S210 that the output difference $\Delta V1$ has exceeded the excessive-temperature-rise determining threshold value Q (S210: YES), the energization of the state detecting element 32 started in S110 above is terminated in the same way as in S160 (S220).

Next, after a "0" is set in a reset flag (S230), a determination is made as to whether or not the output value $\Delta V1$ calculated in S200 exceeds a level determining threshold value R which is greater by a predetermined value than the excessive-temperature-rise determining threshold value Q (i.e., whether or not $R<\Delta V1$ is satisfied) (S240). This "level determining threshold value R" is a value set in advance as an output difference which can be calculated in S200 above in the case where the liquid level of the urea aqueous solution accommodated in the tank is lower than the heater portion 44 of the state detecting element 32 located on the lower side of the electrode pair consisting of the cylindrical members 22, 24 (see FIG. 7).

If it is determined in this S240 that the output difference $\Delta V1$ has exceeded the level determining threshold value R (S240: YES), it is determined that the liquid level of the urea aqueous solution has dropped below the heater portion 44, and a "1" is added to a first abnormality counter K1 (S250).

Next, if the count value of this first abnormality counter K1 is greater than or equal to a predetermined value (e.g., 5) ($K1 \geq 5$) (S260: YES), a first abnormality notice signal for notifying that the tank is empty of the urea aqueous solution (i.e., a state of so-called empty heating) is outputted to the ECU through the input/output circuit 72 (S270). Subsequently, the liquid state detecting sensor 1 is set in a standby state until the lapse of a predetermined standby time (e.g., 60 sec) (S280: NO).

The ECU, to which this first abnormality notice signal has been inputted, is able to prompt the user to replenish the urea aqueous solution in the tank by such as notifying that the tank is empty of the urea aqueous solution.

Subsequently, after the lapse of a predetermined standby time in S280 above (S280: YES), the operation returns to the processing of S110.

Meanwhile, if the count value of the first abnormality counter K1 is not greater than or equal to the predetermined value (S260: NO), the operation proceeds to S280 without carrying out S270, and the liquid state detecting sensor 1 is set in a standby state until a predetermined standby time elapses (S280: NO).

On the other hand, if it is determined in S240 above that the output difference $\Delta V1$ has not exceeded the level determining threshold value R (S240: NO), a "1" is added to a second abnormality counter K2 (S290).

Next, if the count value of this second abnormality counter K2 is greater than or equal to a predetermined value (e.g., 5) ($K2 \geq 5$) (S300: YES), a second abnormality notice signal for notifying that a liquid (such as light oil) having small thermal conductivity other than water is accommodated in the tank is outputted to the ECU through the input/output circuit 72 (S310). Subsequently, the operation proceeds to the processing of S280, and the liquid state detecting sensor 1 is set in a standby state until the lapse of a predetermined standby time (S280: NO).

The ECU, to which this second abnormality notice signal has been inputted, is able to prompt the user to replace the liquid in the tank by such as notifying that a liquid (such as light oil) having small thermal conductivity other than water is accommodated in the tank.

Meanwhile, if the count value of the second abnormality counter K2 is not greater than or equal to the predetermined value (S300: NO), the operation proceeds to S280 without carrying out S310, and the liquid state detecting sensor 1 is set in a standby state until a predetermined standby time elapses (S280: NO).

On the other hand, if it is determined in S210 above that the output difference $\Delta V1$ has not exceeded the excessive-temperature-rise determining threshold value Q (S210: NO), the liquid state detecting sensor 1 is set in a standby state until, in terms of the elapsed time subsequent to the start of energization in S110, a first threshold time tt1 (700 ms in this embodiment) which is longer than the second reference time td2 elapses (S320: NO).

Subsequently, after the lapse of the first threshold time tt1 (S320: YES), a first determined voltage value Vt1, which is outputted from the differential amplifier unit 86 of the state detecting circuit 78 at this point of time, is acquired as a value indicative of an output voltage from the state detecting element 32 (specifically, the heater portion 44) (S330).

Next, a value $\Delta V2$ ($=Vt1-Vd1$) indicative of an output difference between the first determined voltage value Vt1 acquired in S330 and the first reference voltage value Vd1 acquired in S130 is calculated (S340).

Next, a determined concentration value N1, which is obtained by converting the output difference $\Delta V2$ calculated in S340 into the concentration of the liquid to be measured (concentration of urea) at that point of time, is specified (S350).

Figure 8:
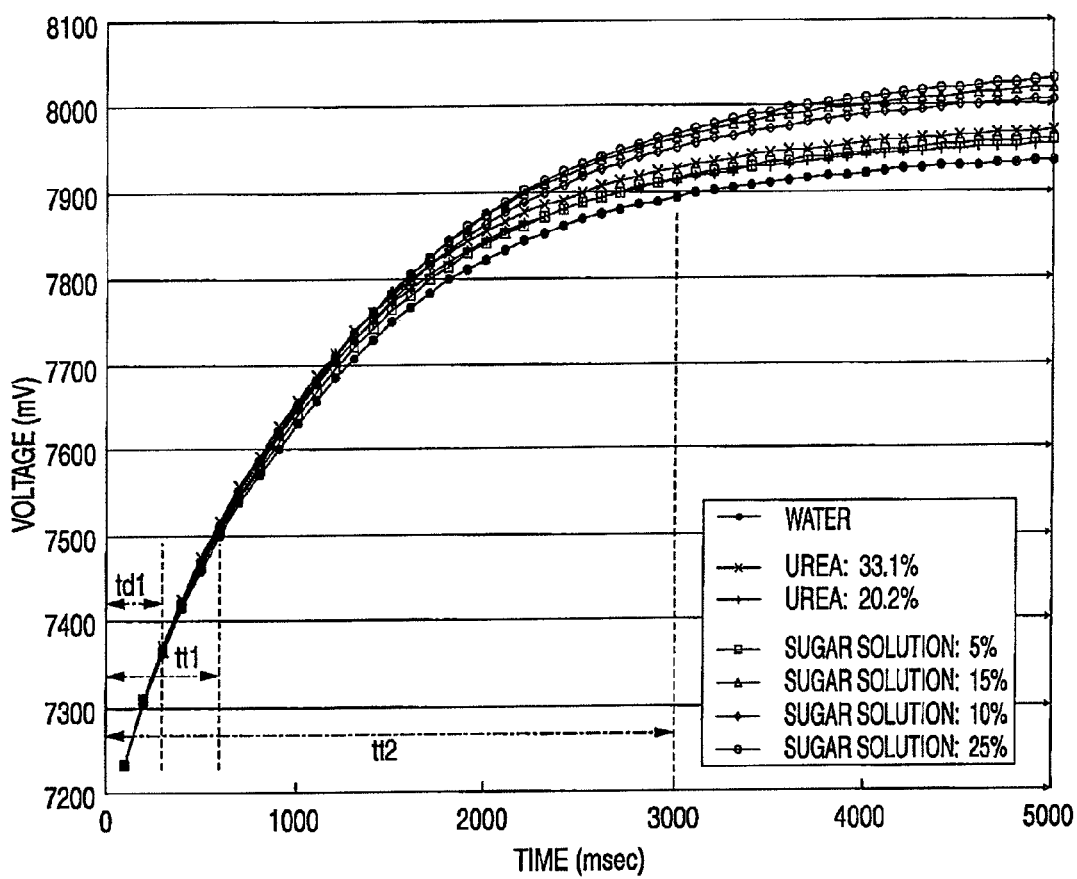
FIG. 8 is a diagram illustrating relationships between the time period of energizing the heater portion and the measured voltage for various fluids and various component concentrations.
Figure 9:
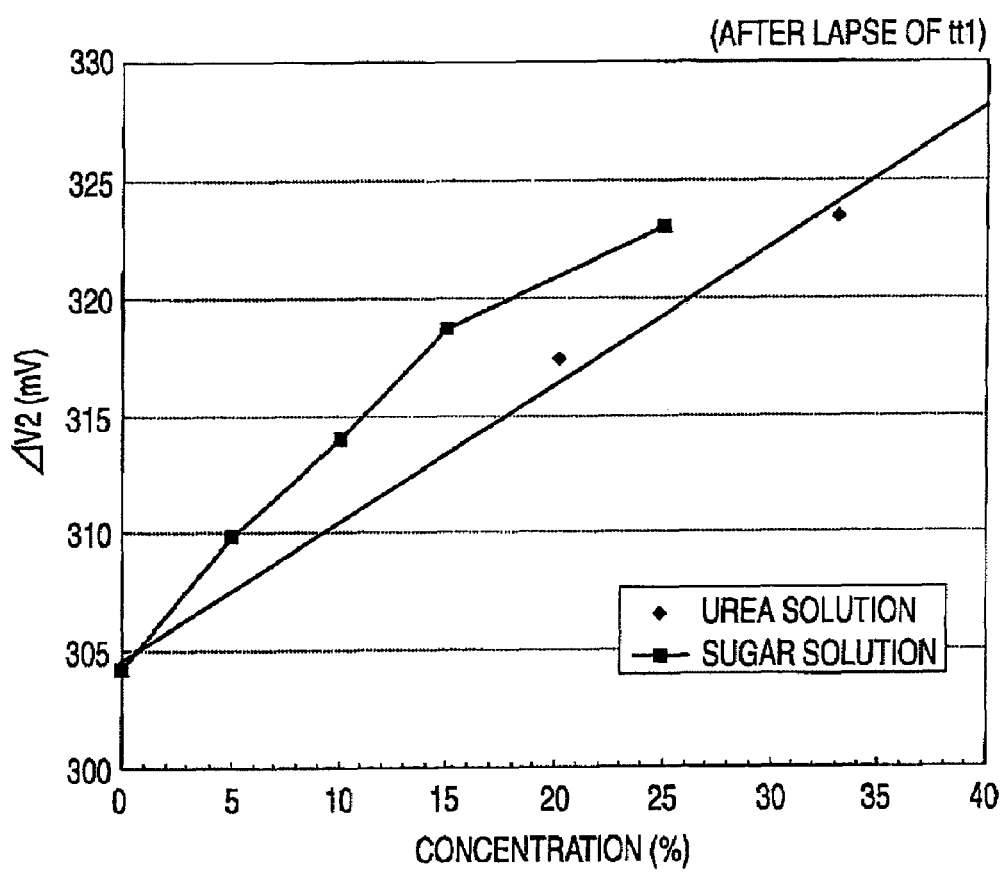
FIG. 9 is a diagram illustrating the relationship between the amount of change in the measured voltage upon the lapse of a first threshold time tt1 and the concentration of a liquid to be measured.

As shown in FIG. 8, in a case where energization of the conductor layer 40 with a constant current is carried out with respect to each state in which urea solution having different concentrations is accommodated in the tank, the output voltage increases in correspondence with the energizing time in the respective cases of concentration. However, the increase pattern varies in correspondence with the concentration. Further, with respect to the urea aqueous solutions of the respective concentrations, if attention is focused on the output difference $\Delta V2$ persisting upon the lapse of the first threshold time tt1, it can be seen that there is a correlation that the value of the output difference $\Delta V2$ becomes large in proportion to the urea concentration, as shown in FIG. 9. For this reason, in this S350, the urea concentration persisting at the time of the output difference $\Delta V2$ calculated in S340 is specified on the basis of concentration information prepared in advance as data (data table or the like) indicating that correlation.

However, in the case where the determined concentration value N1 of the urea aqueous solution is specified on the basis of the output difference $\Delta V2$, even if, for instance, a sugar solution with a 25% concentration is contained in the tank, since its output difference with urea solution having a 33.1% concentration is equivalent at substantially V2, the determined concentration value N1 of the urea aqueous solution is specified as being 33.1% (see FIG. 9). For this reason, if only the determined concentration value N1 of the urea aqueous solution is used, it is impossible to determine whether or not the liquid to be measured in the tank is a particular type of liquid (i.e., the urea aqueous solution of an appropriate concentration).

Accordingly, in the state detection processing in accordance with this embodiment, when the processing of S350 is finished, the operation proceeds to ensuing processing. Specifically, after the determined concentration value N1 is specified in S350, the liquid state detecting sensor 1 is set in a standby state until, in terms of the elapsed time subsequent to the start of energization in S110, the second threshold time tt2 (3000 ms in this embodiment) which is longer than the first threshold time tt1 elapses (S360: NO).

Subsequently, after the lapse of the second threshold time tt2 (S360: YES), a second determined voltage value Vt2, which is outputted from the differential amplifier unit 86 of the state detecting circuit 78 at this point of time, is specified as a value indicative of an output voltage from the state detecting element 32 (specifically, the heater portion 44) (S370).

Next, a value ΔV3 (=Vt2−Vd1) indicative of an output difference between the second determined voltage value Vt2 acquired in S370 and the first reference voltage value Vd1 acquired in S130 is calculated (S380).

Then, a determined concentration value N2, which is obtained by converting the output difference ΔV3 calculated in S380 into the urea concentration at that point of time, is specified (S390). Here, the urea concentration of the urea aqueous solution persisting at the time of the output difference ΔV3 calculated in S380 is specified on the basis of concentration information prepared in advance as data (data table or the like) indicating a correlation (see FIG. 10) in the case where, in the increase pattern (FIG. 8) of the above-described output voltage, attention is focused only on the output difference ΔV3 persisting upon the lapse of the second threshold time tt2.

Figure 10:
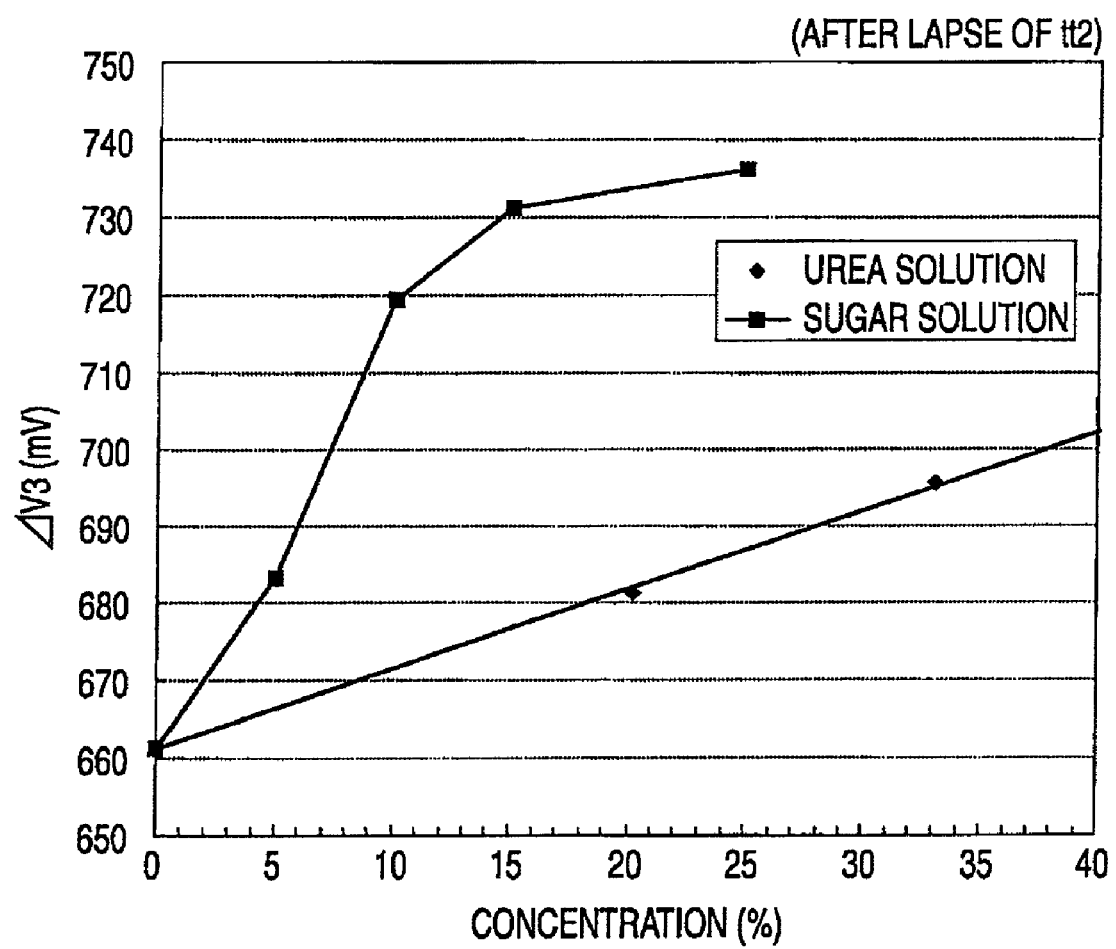
FIG. 10 is a diagram illustrating the relationship between the amount of change in the output voltage upon the lapse of a second threshold time tt2 and the concentration of the liquid to be measured.

It should be noted that in the case where the determined concentration value N2 of the urea aqueous solution is specified on the basis of the output difference ΔV3, if, for example, a sugar solution with a 25% concentration is contained in the tank, the determined concentration value N2 of the urea aqueous solution, although not shown in FIG. 10, is specified as being 75%. Namely, in the case where the liquid in the tank is the sugar solution with a 25% concentration, the determined concentration value N1 of the urea aqueous solution specified on the basis of the output difference ΔV2 and the determined concentration value N2 specified on the basis of the output difference ΔV3 assume values which are wide apart.

After the determined concentration value N2 has thus been specified in S390, if a "1" is set in the reset flag (S400: YES), the first and second abnormality counters K1 and K2 are reset (S410), and the operation then proceeds to ensuing processing (S430). Meanwhile, if a "0" is set in the reset flag (S400: NO), a "1" is set in the reset flag (S420), and the operation then proceeds to ensuing processing (S430).

Next, a determination is made as to whether or not the determined concentration value N1 specified in S350 is greater than or equal to a predetermined threshold value T (S430). This "threshold value T" is a value which is set as a low concentration of such a measure that the liquid accommodated in the tank can be regarded as water.

If it is determined in this S430 that the determined concentration value N1 is not greater than or equal to the predetermined threshold value T (S430: NO), it is determined that the liquid accommodated in the tank is water (S440), and a third abnormality notice signal for notifying to that effect is outputted to the ECU outside the liquid state detecting sensor 1 through the input/output circuit 72 (S450). Subsequently, the operation proceeds to the processing of S280.

The ECU, to which this third abnormality notice signal has been inputted, is able to prompt the user to replace the liquid in the tank by such as notifying that the liquid accommodated in the tank is water.

Meanwhile, if it is determined in S430 that the determined concentration value N1 is greater than or equal to the predetermined threshold value T (S430: YES), a determination is made as to whether or not an absolute value of the difference between the determined concentration value N1 specified in S350 and the determined concentration value N2 specified in S390 is less than or equal to a predetermined threshold value SH (|N1−N2|≦SH) (S460). This "threshold value SH" is a value which is set as a value which can be reached as an absolute value of the difference between the determined concentration value N1 and the determined concentration value N2 in the case where the liquid accommodated in the tank is an inappropriate liquid (specifically, sugar solution) other than the urea aqueous solution of an appropriate concentration.

If it is determined in this S460 that the determined concentration value N2 is less than or equal to the predetermined threshold value SH (S460: YES), it is determined that the liquid accommodated in the tank is the urea aqueous solution of a particular concentration (S470), and a normality notice signal for notifying to that effect is outputted to the ECU outside the liquid state detecting sensor 1 through the input/output circuit 72 (S480). Subsequently, the operation proceeds to the processing of S280.

The ECU, to which this normality notice signal has been inputted, is able to execute processing for notifying the user such as that the liquid is normal.

Meanwhile, if it is determined in S460 above that the determined concentration value N2 is greater than the predetermined threshold value SH (S460: NO), it is determined that the liquid accommodated in the tank is an inappropriate liquid (specifically, sugar solution) (S490), and a fourth abnormality notice signal for notifying to that effect is outputted to the ECU through the input/output circuit 72 (S500). Subsequently, the operation proceeds to the processing of S280.

The ECU, to which this fourth abnormality notice signal has been inputted, is able to prompt the user to replace the liquid in the tank by such as notifying that the liquid accommodated in the tank is an inappropriate liquid.

Thus, in the state detection processing in this embodiment, it is possible to determine whether or not the liquid in the tank is a particular type of liquid, i.e., the urea solution of an appropriate concentration, on the basis of the degree of approximation between the determined concentration values N1 and N2 of the urea aqueous solution.

In the liquid state detecting sensor 1 thus configured, whether or not an excessive temperature rise has occurred in the state detecting element 32 is determined on the basis of the output difference ΔV1 (=Vd2−Vd1), which is calculated by using the first reference voltage value Vd1 acquired upon the lapse of the first reference time td1 and the second reference voltage value Vd2 acquired upon the lapse of the second reference time td2, both after the start of energization of the heater portion 44 of the state detecting element 32, as well as the excessive-temperature-rise determining threshold value Q for determining an excessive temperature rise (S210 in FIG. 6). Then, if it is determined that an excessive temperature rise has occurred in the state detecting element 32, the energization of the heater portion 44 of the state detecting element 32 is forcibly terminated immediately after that determination (S220 in FIG. 6).

The second reference voltage value Vd2 used in this determination of the presence or absence of an excessive temperature rise is acquired at a timing between the acquisition of the first reference voltage value Vd1 and the acquisition of the second determined voltage value Vt2. For this reason, the fact that the energization of the heater portion 44 is forcibly terminated immediately after the determination that an excessive temperature rise has occurred means that that energization is terminated before the second threshold time tt2 elapses.

Thus, even if an excessive temperature rise has occurred in the state detecting element 32, it is possible to forcibly terminate the energization of the heater portion 44 before the lapse of the second threshold time tt2. Therefore, it is possible to prevent the occurrence of breakage of the state detecting element 32 due to the continuation of the excessive temperature rise for a long time period.

It should be noted that, in this embodiment, S110 in FIG. 6 corresponds to an energization unit of the invention; S130 in the drawing corresponds to a reference acquiring unit of the invention; S370 in the drawing corresponds to a first output acquiring unit of the invention; S380 in the drawing corresponds to a first calculating unit of the invention; and S440, S470, and S490 correspond to a state detecting unit. In addition, the heater portion 44 corresponds to a heating resistor of the invention; the second threshold time tt1, to a detection time period; the first reference voltage value Vd1, to a reference value of the invention; the second determined voltage value Vt2, to a first output value of the invention; and the output difference $\Delta V3$, to a first calculated value of the invention.

Furthermore, S190 in FIG. 6 corresponds to a second output acquiring unit of the invention; S200 in the drawing corresponds to a second calculating unit of the invention; S210 in the drawing corresponds to an excessive-temperature-rise determining unit of the invention; S220 in the drawing corresponds to an energization terminating unit of the invention; the second reference voltage value Vd2 corresponds to a second output value of the invention; and the output difference $\Delta V1$ corresponds to a second calculated value of the invention. In addition, in FIG. 6, S330 corresponds to a third output acquiring unit of the invention; S340 in the drawing corresponds to a third calculating unit of the invention; and the output difference $\Delta V2$ corresponds to a third calculated value of the invention.

Although a description has been given above of the embodiment of the invention, the invention is by no means limited to the above-described embodiment, and it goes without saying that various changes may be made without departing from the technical scope of the invention.

For example, in the above-described embodiment, an illustration has been given of the case where after the first and second determined concentration values N1 and N2 are respectively specified from the output differences $\Delta V2$ and $\Delta V3$, the state detection of the liquid to be measured is arranged to be performed on the basis of these first and second determined concentration values N1 and N2. However, the state detection of the liquid to be measured may be performed directly on the basis of the output differences $\Delta V2$ and $\Delta V3$ without specifying the first and second determined concentration values N1 and N2.

In addition, in the above-described embodiment, an illustration has been given of the case where immediately after a determination is made that an excessive temperature rise has occurred in the state detecting element 32, the energization of its heater portion 44 is arranged to be terminated (S210 and S220 in FIG. 6). However, this termination of energization may be effected at any timing insofar as it is before the lapse of the second threshold time tt2.

In addition, in the above-described embodiment, an illustration has been given of the configuration in which the concentration information which is referred to at the time of specifying the concentration in S350 and S390 in FIG. 6 is a data table. However, this concentration information is sufficient if it is capable of specifying the above-described correlation between the output difference and the concentration for each energizing time, and an arithmetic expression, for example, may be used.

Furthermore, in the above-described embodiment, the configuration provided is such that whether the liquid in the tank is an appropriate urea aqueous solution or a sugar solution is determined by using both output differences $\Delta V2$ and $\Delta V3$. However, the state detection of the liquid to be measured may be performed by simplifying the state detection processing by the microprocessor shown in FIG. 6, as described below.

Specifically, after omitting the processing of S360 to S390 and S460, S470, S490, and S500, the processing of the respective steps in FIG. 6 can be executed. In this case, in S430, whether or not the concentration of the urea aqueous solution is appropriate is determined on the basis of the output difference $\Delta V2$. Even such state detection processing is able to perform the state detection of the liquid to be measured (urea aqueous solution).

In the case where such simplified state detection processing is applied to the liquid state detecting sensor, unlike the above-described embodiment, S330 in FIG. 6 serves as the first output acquiring unit; S340 in the drawing serves as the first calculated-value calculating unit; and S430, S440, and S470 serve as the state detecting unit. Further, the first threshold time tt1 serves as the detection time; the first determined voltage value Vt1 serves as the first output value of the invention; and the output difference $\Delta V2$ serves as the first calculated value.

For convenience, the following is a listing of the reference numerals used hereinabove:

1: liquid state detecting sensor
10: base body
12: circuit board
20: electrode structure
30: element structure
32: state detecting element
36: protector
39: insulating ceramic substrate
40: conductor layer
44: heater portion
46: temperature rise region
72: input/output circuit
74: microprocessor
76: liquid level detecting circuit
78: state detecting circuit
82: constant current output unit
84: switch unit
86: differential amplifier unit Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A liquid state detecting sensor comprising:
   a state detecting element comprising a heating resistor having a resistance value that changes in correspondence with a temperature thereof, the state detecting element being immersed in a liquid to be measured;
   an energization unit for energizing the heating resistor;
   a first output acquiring unit for acquiring a first output value which is outputted in correspondence with the resistance value of the heating resistor at the end of a detection time period measured from a start of the energizing of the heating resistor by the energization unit;
   a reference acquiring unit for acquiring a reference value which is outputted in correspondence with the resistance value of the heating resistor prior to the end of the detection time period;
   a first calculating unit for calculating a first calculated value using the first output value and the reference value;
   a state detecting unit for detecting a state of the liquid to be measured based on the first calculated value;

a second output acquiring unit for acquiring a second output value corresponding to the resistance value of the heating resistor after acquiring the reference value and before acquiring the first output value;

a second calculating unit for calculating a second calculated value using the second output value and the reference value;

an excessive-temperature-rise determining unit for determining whether an excessive temperature rise has occurred in the state detecting element based on (i) the second calculated value, and (ii) an excessive-temperature-rise determining threshold value; and an energization terminating unit for terminating the energizing of the heating resistor by the energization unit before the end of the detection time period in response to a determination by the excessive-temperature-rise determining unit that an excessive temperature rise has occurred in the state detecting element.

2. The liquid state detecting sensor according to claim 1, further comprising:

a third output acquiring unit for acquiring a third output value which is outputted in correspondence with the resistance value of the heating resistor prior to the end of the detection time period and after acquiring the second output value; and a third calculating unit for calculating a third calculated value using the third output value and the reference value, wherein the state detecting unit detects the state of the liquid to be measured based on the first calculated value and the third calculated value.

3. The liquid state detecting sensor according to claim 1, wherein the second output acquiring unit is further for acquiring the second output value before one-half of the detection time period has elapsed.

4. The liquid state detecting sensor according to claim 1, the energization terminating unit is further for terminating the energizing of the heating resistor by the energization unit immediately after it is determined by the excessive-temperature-rise determining unit that the excessive temperature rise has occurred in the state detecting element.

5. The liquid state detecting sensor according to claim 1, wherein when the second calculated value has exceeded the excessive-temperature-rise determining threshold value, the excessive-temperature-rise determining unit determines that the excessive temperature rise has occurred in the state detecting element, and when the second calculated value has exceeded a level determining threshold value which is greater than the excessive-temperature-rise determining threshold value, the excessive-temperature-rise determining unit determines that a liquid level of the liquid to be measured has dropped below the heating resistor.

6. The liquid state detecting sensor according to claim 1, wherein the state detecting element comprises the heating resistor sealed in an insulating ceramic substrate.

* * * * *

UNITED STATES PATENT AND TRADEMARK OFFICE
CERTIFICATE OF CORRECTION

PATENT NO. : 7,637,148 B2  Page 1 of 1
APPLICATION NO. : 12/013820
DATED : December 29, 2009
INVENTOR(S) : Sasanuma et al.

It is certified that error appears in the above-identified patent and that said Letters Patent is hereby corrected as shown below:

On the cover page under (75) Inventors:
Change "Takashi Yamomoto" to
--Takashi Yamamoto--.

Signed and Sealed this

Twenty-third Day of February, 2010

David J. Kappos
*Director of the United States Patent and Trademark Office*